March 12, 1946.　　　D. L. FORBESS　　　2,396,366
FISH LURE
Filed Sept. 27, 1944

INVENTOR.
DELBERT L. FORBESS
BY Edward M. Apple
ATTORNEY

Patented Mar. 12, 1946

2,396,366

UNITED STATES PATENT OFFICE 2,396,366

FISH LURE

Delbert L. Forbess, Hazel Park, Mich.

Application September 27, 1944, Serial No. 555,946

3 Claims. (Cl. 43—36)

This invention relates to fishing tackle, and has particular reference to a lure of the weedless type.

An object of the invention is the provision of an artificial bait which may be efficiently used without danger of becoming entangled with underwater obstructions, such as weeds, logs, and rocks.

Another object of the invention is the provision of a fish lure which is streamlined in design, economical to manufacture and foolproof in its operation.

Another object of the invention is the provision of a device of the character referred to, in which the fish hooks are entirely concealed within the body of the lure.

Another object of the invention is to generally improve devices of this character.

I am aware that similar devices are now on the market, but most of the devices now known to the public have inherent difficulties which make them inefficient in operation.

The foregoing and other objects and advantages of the invention will become more apparent as the description proceeds, reference being made from time to time to the accompanying drawing forming part of this disclosure, in which drawing.

Figure 1:
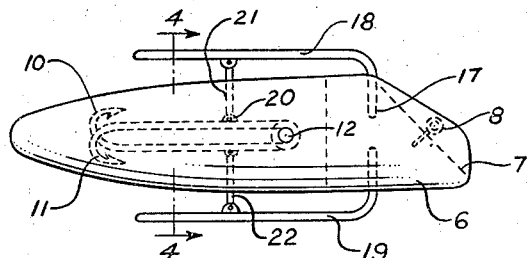
Fig. 1 is a side elevational view of a device embodying my invention.

Referring now more particularly to the drawing, it will be understood that in the embodiment herein disclosed, my improved device consists of a body 6, made of wood or other suitable material. The body 6 is provided with a cut-out portion 7, in which is positioned a screw eye 8, with which the device may be secured to a fish line in the usual manner. The body 6 is preferably streamlined so that it may be drawn through the water with a minimum of friction.

Figure 3:
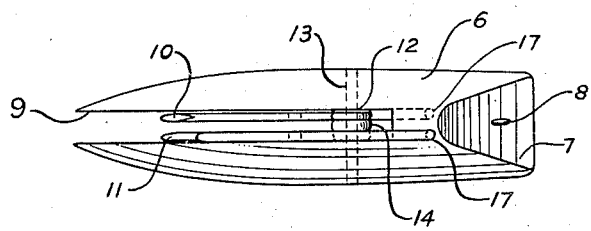
Fig. 3 is a top plan view of the device illustrated in Fig. 1.

The body 6 is slotted as at 9 throughout a substantial portion of its length. The slot 9 is adapted to house a pair of fish hooks 10 and 11, which are pivoted as at 12, on a suitable pin 13, which extends through the body 6. A washer 14 (Figs. 3 and 4) serves as a spacer between the hooks 10 and 11, and washers 15 and 16 (Fig. 4) serve to protect the body 6 from undue wear caused by the hooks 10 and 11.

Press-fitted as at 17, in suitable bores formed in the body 6, are curved spring levers 18 and 19. These members 18 and 19 serve as bumpers or guards for the body 6, and permit the lure to be dragged through weeds, and other obstructions without becoming entangled. The spring lever 18 is connected to the shank of the hook 11, as at 20, by means of a push rod 21, which is pivoted at either end for movement in conjunction with the lever 18 and the hook 11. The spring lever 19 is similarly connected to the fish hook 10 by means of the push rod 22.

Figure 4:
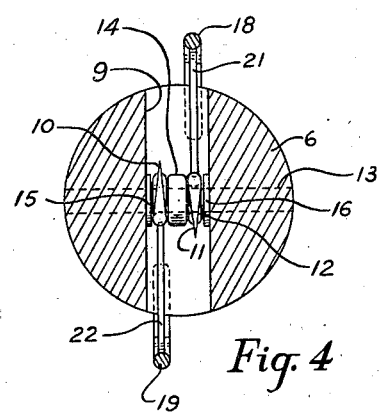
Fig. 4 is a section taken substantially on the line 4—4 of Fig. 1.

It will be noted in Figs. 1 and 4 that the fish hooks 10 and 11 are normally housed within the body member 6, so that they do not cause any obstruction to the travel of the body 6 through water infested with weeds and other obstructions.

Figure 2:
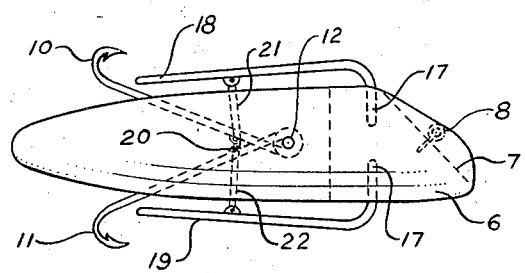
Fig. 2 is a view similar to Fig. 1, but showing the fish hooks in extended position.

As the lure is drawn through the water, it would assume the position shown in Fig. 1, so that a fish being attracted by the moving lure would strike the body 6, closing its mouth over the spring levers 18 and 19, causing the spring levers 18 and 19 to be pressed toward the center of the body 6 as shown in Fig. 2. The compression of the spring levers 18 and 19 causes the outward movement of the hooks 10 and 11, so that they will engage the inside of the fish's mouth to prevent his becoming disengaged from the bait.

Having described my invention, what I claim and desire to secure by Letters Patent is:

1. In a device of the character described, including a slotted body, the combination of a pair of fish hooks normally concealed within said body, and pivoted at one end for outward movement therefrom, a pair of spring levers respectively secured at one end to said body, a push rod pivotally connected to each of said spring levers and to each of said fish hooks intermediate the ends thereof, whereby upon inward compression of said spring levers said fish hooks are outwardly propelled.

2. The combination defined in claim 1, in which the spring levers are normally positioned in planes parallel to the longitudinal axes of the said body and the said hooks, and the said push rods normally lie at right angles thereto.

3. The combination defined in claim 1, in which the fish hooks are pivoted about a common axis and the push rods respectively engage the said fish hooks between the said pivot point and the free ends of said hooks.

DELBERT L. FORBESS.